United States Patent
Meijer et al.

(10) Patent No.: US 10,595,542 B2
(45) Date of Patent: Mar. 24, 2020

(54) METHOD FOR PRODUCING SWISS-TYPE CHEESE

(71) Applicant: CSK Food Enrichment B.V., Leeuwarden (NL)

(72) Inventors: Willem Cornelis Meijer, Bennekorn (NL); Lourdes Mariela Serrano Davalos, Arnhem (NL); Lex Smalbrink, Ede (NL)

(73) Assignee: CSK FOOD ENRICHMENT B.V., Leeuwarden (NL)

( * ) Notice: Subject to any disclaimer, the term of this patent is extended or adjusted under 35 U.S.C. 154(b) by 421 days.

(21) Appl. No.: 14/974,633

(22) Filed: Dec. 18, 2015

(65) Prior Publication Data

US 2016/0174587 A1 Jun. 23, 2016

(30) Foreign Application Priority Data

Dec. 19, 2014 (NL) .................................... 2014027
Feb. 24, 2015 (EP) .................................... 15156385

(51) Int. Cl.
*A23C 19/00* (2006.01)
*A23C 19/032* (2006.01)
*A23C 19/068* (2006.01)
*A23C 19/11* (2006.01)

(52) U.S. Cl.
CPC ...... *A23C 19/0321* (2013.01); *A23C 19/0323* (2013.01); *A23C 19/0688* (2013.01); *A23C 19/11* (2013.01); *A23Y 2220/31* (2013.01); *A23Y 2220/49* (2013.01); *A23Y 2240/75* (2013.01); *A23Y 2320/00* (2013.01); *A23Y 2320/25* (2013.01); *A23Y 2320/39* (2013.01)

(58) Field of Classification Search
CPC ............ A23C 19/0321; A23C 19/0323; A23C 19/0688; A23C 19/11; A23Y 2220/31; A23Y 2220/49; A23Y 2240/75; A23Y 2320/00; A23Y 2320/25; A23Y 2320/39

USPC ................ 426/34, 36, 42, 43, 532, 580, 582
See application file for complete search history.

(56) References Cited

U.S. PATENT DOCUMENTS

| 4,242,362 A | 12/1980 | Grigsby |
| 5,006,348 A | 4/1991 | Pope et al. |
| 9,332,770 B2 * | 5/2016 | Griffin ............... A23C 19/0323 |
| 2011/0129568 A1 * | 6/2011 | Fukui .................... A23C 9/123 |
| | | 426/43 |

FOREIGN PATENT DOCUMENTS

| EP | 1 273 237 A1 | 8/2003 |
| WO | WO-96/32482 A1 | 10/1996 |
| WO | WO-99/66949 A2 | 12/1999 |
| WO | WO-99/67287 A1 | 12/1999 |
| WO | WO-01/70037 A1 | 9/2001 |
| WO | WO-2006/098972 A1 | 9/2006 |

OTHER PUBLICATIONS

European Search Report issued in European Patent Application No. EP 15 15 6385.5 dated Jun. 3, 2015.

* cited by examiner

*Primary Examiner* — Leslie A Wong
(74) *Attorney, Agent, or Firm* — Gilberto M. Villacorta; Sunit Talapatra; Foley & Lardner LLP

(57) ABSTRACT

The invention relates to an improved method for the production of curd and for the production of cheese from said curd, in particular a Swiss-type cheese, wherein a precursor is inoculated with a starter culture comprising a strain of dairy Propionibacteria, a strain of lactic acid bacteria and a source of lacticin. The invention further relates to curds and cheeses obtainable by the method as well as to a starter culture for producing a cheese, comprising a strain of dairy Propionibacteria, a strain of lactic acid bacteria and a source of lacticin.

17 Claims, No Drawings
Specification includes a Sequence Listing.

METHOD FOR PRODUCING SWISS-TYPE CHEESE

CROSS-REFERENCE TO RELATED APPLICATIONS

This non-provisional U.S. Patent Application claims priority to Netherlands Patent Application No. 2014027, filed Dec. 19, 2014, and European Patent Application No. 15156385.5, filed Feb. 24, 2015. The contents of these applications are herein incorporated by reference in their entirety.

The instant application contains a Sequence Listing which has been submitted in ASCII format via EFS-WEB and is hereby incorporated by reference in its entirety. Said ASCII copy, created on Dec. 18, 2015, is named Sequence.txt and is 3 KB.

The present invention relates to an improved method for producing cheese, in particular Swiss-type cheese, as well as cheeses obtained thereby and starter cultures that may be used therein.

BACKGROUND

Driven by consumer preference, the dairy industry is constantly striving to achieve minimally processed foods which are free from artificial preservatives. In this context, much attention is being directed to preventing growth of and/or killing of *Listeria* spp. and/or *Clostridia* spp. with the use of bacteriocins produced by microorganisms that are generally recognized as safe (GRAS), including many lactic acid bacteria (LAB). Bacteriocins are ribosomally synthesized anti-microbial compounds that are produced by many different bacterial species. Lacticin is a known bacteriocin, e.g. from WO 96/32482, and is known to be active against Gram-positive bacteria.

Methods for making Swiss-type cheeses are e.g. known from WO 01/70037, U.S. Pat. Nos. 4,242,362, 5,006,348 and WO 2006/098972. In known methods for making Swiss-type (or Gouda-type) cheeses, pathogen contamination is prevented by adding lysozyme or nitrate to the cheese milk, nitrate rinsing of the curd and/or bactofugation. For a further explanation (on Gouda-type cheese), see e.g. Van den Berg et al. in Cheese: Chemistry, Physics and Microbiology, Third edition—Volume 2: Major Cheese Groups, 2004, 133-134. These methods are undesirable for a number of reasons including environmental or legal aspects or reasons of process efficiency.

SUMMARY OF THE INVENTION

The invention relates to an improved method for the manufacture of curd and for the manufacture of cheese, in particular Swiss-type cheese. The method according to the invention involves the manufacture of curd from a precursor in the presence of dairy Propionibacteria and a source of a lacticin, which comprises (a) inoculating a precursor with a starter culture comprising a strain of dairy Propionibacteria, a strain of lactic acid bacteria and a source of lacticin. Preferably, a strain of lactic acid bacteria acts as source of lacticin. Thus, to make it absolutely clear and as is also explained in detail below, the method according to the invention involves the manufacture of curd from a precursor in the presence of dairy Propionibacteria and a source of a lacticin, which comprises (a) inoculating a precursor with a starter culture comprising a strain of dairy Propionibacteria, a strain of lactic acid bacteria and a source of lacticin, wherein the strain of lactic acid bacteria can be or can comprise the source of lacticin.

The present invention also relates to a method for the manufacture of cheese, particularly Swiss-type cheese, using the curd obtained by the above method and comprising manufacturing a cheese from said curd. The present invention also relates to a starter culture that can be used in the methods according to the invention, and to the curd and the cheese obtainable thereby. Further, the invention relates to the use of the starter culture to produce curd and/or cheese, and to the use of the curd to produce cheese. As example of the effectiveness of the process according to the invention, the inventors showed that a Maasdam-type cheese was readily prepared in the presence of a starter culture comprising a lactococcal strain capable of producing lacticin and a strain of *P. freudenreichii*.

The inventors surprisingly found that using a source of lacticin as bacteriocin was effective to prevent outgrowth of *Clostridium tyrobutyricum* but did not seriously hamper the activity of the dairy Propionibacteria. Using a source of lacticin in combination with dairy Propionibacteria has not been suggested in the prior art. The method of preparing cheese in the presence of Propionibacteria according to the present invention has some major advantages with respect to prior art methods. Since a source of lacticin is present, the growth of unwanted microorganisms, such as *Listeria* strains, and/or *Clostridia* strains or spores, is prevented by virtue of the bacteriocin nature of lacticin. Therefore, other measures for preventing such unwanted microorganisms are not required, e.g. no nitrate rinsing of the curd, no nitrate addition to the precursor (especially milk) and no bactofugation of the cheese milk are required. Apart from obvious disadvantages relating to process time and investment in equipment, a downside of bactofugation is that spores may remain that withstand mild heat treatment. Nitrate rinsing or addition may provide for better eradication of spores but is becoming increasingly undesirable in view of health concerns and legal requirements.

Moreover, Propionibacteria are very sensitive to nitrate. A further advantage of the use of the source of lacticin to at least partially replace nitrate is that the outgrowth of the dairy Propionibacteria itself is not or at least less negatively influenced by nitrate. Prior art solutions to lessen the inhibiting effect of nitrate on Propionibacteria in Maasdam or Emmental cheese making comprise the use of lactobacilli as adjunct cultures. Although the use of lactobacilli as adjunct cultures may still be favourable, e.g. for generating specific flavours, they are not needed for their nitrate mitigation properties per se. Thus, in one embodiment, the process for making curd and/or the process of making cheese according to the invention do not comprise a step of nitrate rinsing of the curd or a step of nitrate addition to the precursor.

LIST OF PREFERRED EMBODIMENTS

1. A method for the production of curd from a precursor in the presence of dairy Propionibacteria and a source of a lacticin, which comprises (a) inoculating the precursor with a starter culture comprising a strain of dairy Propionibacteria, a strain of lactic acid bacteria and a source of lacticin.
2. The method according to embodiment 1, wherein the source of lacticin comprises a source of lacticin 3147.
3. The method according to embodiment 1 or 2, wherein the dairy Propionibacteria comprise a strain of *P. johnsonii*, a strain of *P. freudenreichii* subsp. *freudenreichii*, a strain of *P. freudenreichii* subsp. *shermanii* or a mixture thereof 4. The method according to any one of the preceding embodiments, wherein the strain of lactic acid bacteria comprises the source of lacticin, and wherein preferably the source of lacticin comprises a strain of *Lactococcus lactis*.
5. The method according to any one of the preceding embodiments, wherein the source of lacticin is a bacterial strain capable of producing lacticin, preferably wherein the bacterial strain is a strain of *Lactococcus lactis* subsp., most preferably a strain of *L. lactis* subsp. *lactis*, a strain of *L. lactis* subsp. *cremoris* or a strain of *L. lactis* subsp. *lactis* biovar. *diacetylactis*.
6. The method according to embodiment 5, wherein the source of lacticin is a lactococcal strain containing plasmid pMRC01.
7. The method according to any one of the preceding embodiments, wherein the strain of lactic acid bacteria further comprises a strain of *Streptococcus thermophilus*, preferably a strain of *Streptococcus thermophilus* that has been adapted to lacticin.
8. The method according to any one of the preceding embodiments wherein the starter culture further comprises a strain of *Lactobacillus delbrueckii* subsp., preferably a strain of *L. delbrueckii* subsp. *lactis*.
9. The method according to any one of the preceding embodiments, wherein the starter culture further comprises a strain of *Lactobacillus helveticus* and/or a strain of *Lactobacillus acidophilus*.
10. The method according to any one of the preceding embodiments, wherein the precursor comprises milk.
11. The method according to any one of the preceding embodiments, further comprising (b) cutting the curd and/or (c) draining the curd.
12. The method according to any one of the preceding embodiments, wherein the starter culture does not comprise a source of nisin and/or a source of a type IIa bacteriocin.
13. Starter culture for making curd and/or cheese comprising dairy Propionibacteria, a strain of lactic acid bacteria and a source of a lacticin, preferably a source of lacticin 3147.
14. Starter culture according to embodiment 13, wherein the strain of lactic acid bacteria comprises the source of lacticin, and wherein preferably the source of lacticin comprises a strain of *Lactococcus lactis*.
15. Starter culture according to embodiment 13 or 14, wherein the source of lacticin is a bacterial strain capable of producing lacticin, preferably wherein the bacterial strain is a strain of *Lactococcus lactis* subsp., most preferably a strain of *L. lactis* subsp. *lactis*, a strain of *L. lactis* subsp. *cremoris* or a strain of *L. lactis* subsp. *lactis* biovar. *diacetylactis*.
16. Starter culture according to any one of embodiments 13-15, further comprising one or more strains selected from *Lactobacillus delbrueckii* subsp. *lactis*.
17. Starter culture according to any one of embodiments 13-16, further comprising a strain of *Lactobacillus acidophilus* and/or *Lactobacillus helveticus*.
18. Starter culture according to any one of embodiments 13-17, further comprising a strain of *Streptococcus thermophilus*, preferably a strain of *Streptococcus thermophilus* that has been adapted to lacticin.
19. Method for the production of cheese, which comprises (d) manufacturing cheese from a curd, wherein the curd is obtained by the method of any one of embodiments 1-12.
20. The method according to embodiment 19, wherein the cheese is of the Emmental-type or Maasdam-type, preferably of the Maasdam-type.
21. The method according to embodiment 19 or 20, wherein the cheese has eyes, preferably at least 1, more preferably at least 3, most preferably at least 5 vol. % of the cheese is formed by eyes.
22. The method according to any one of embodiments 19-21, wherein (d) comprises pressing and shaping the curd, adding salt to the curd to form green cheese, preferably vacuum packaging the green cheese in a foil or providing the green cheese with a cheese coating, and ripening the optionally foil-packed or coated green cheese.
23. Use of the starter culture according to any one of embodiments 13-18, for the manufacture of curd and/or cheese.
24. Curd obtainable by the method according to any one of embodiments 1-12.
25. Cheese obtainable by the method according to any one of embodiments 19-22.
26. Curd according to embodiment 24 or cheese according to embodiment 25, having a nisin content of less than 50 IU per gram and a type IIa bacteriocin content, especially a plantaricin content, which is not effective to prevent outgrowth of *Listeria monocytogenes*.
27. Use of the curd according to embodiment 24 or 26 for the manufacture of cheese, preferably Swiss-type cheese, most preferably Maasdam-type cheese.

DETAILED DESCRIPTION

In a first aspect, the invention relates to a method for producing curd. In a second aspect, the invention relates to a starter culture suitable to be used in the present method for producing curd, and to the use of the starter culture in producing curd and/or cheese. In a third aspect, the invention relates to curd, and to the use of said curd in producing cheese. In a fourth aspect, the invention relates to a method for producing cheese. In a fifth aspect, the invention relates to cheese.

Process for Making Curd

The invention relates in a first aspect to an improved method for the production of curd from a precursor. The curd obtained as such is particularly suitable for the production of Swiss-type cheeses. The manufacture of Swiss-type cheeses is characterized by inoculating a precursor, typically a cheese precursor such as (cheese) milk, with dairy Propionibacteria in the preparation of the curd. The cheese is preferably of the brined type. Preferably, the curd is not dry salted. In the context of the present invention, Swiss-type cheeses includes any type of cheese manufactured in the presence of dairy Propionibacteria, such as Emmentaler and Maasdammer. The method according to the invention involves the production of curd from a precursor in the presence of dairy Propionibacteria and a source of a lacticin, which comprises (a) inoculating the precursor with a starter culture comprising a strain of dairy Propionibacteria, a strain of lactic acid bacteria and a source of lacticin.

Methods for making curd are well-known in the art, and the present invention covers all known variants thereof, as long as the precursor is inoculated with a starter culture according to the invention, comprising dairy Propionibacteria, a strain of lactic acid bacteria and a source of lacticin. Inoculating a cheese precursor with a starter culture is a well-known procedure in the dairy industry and is part of the cheese making process. Upon inoculation as in (a), fermentation occurs wherein at least propionic acid (or propionate) and $CO_2$ are formed. The dairy Propionibacteria are capable of converting glucose or lactic acid (or lactate) into, amongst others, propionic acid (or propionate) and $CO_2$. Typically, the inoculated cheese precursor is left for an appropriate amount of time (e.g. 4-48 h) at a suitable temperature for dairy Propionibacteria to produce $CO_2$ which typically ranges between 15-30° C. The acidification of the precursor that occurs during (a) typically gives rise to coagulation of casein proteins, although further proteins present in the cheese precursor, e.g. whey proteins, may also coagulate to a certain extent. The coagulated proteins typically aggregate into solid masses, which are referred to in the art as curd. The process of coagulation and aggregation is also referred to as curdling. Coagulation is typically enhanced by adding coagulant such as rennet. The addition of coagulant is preferably part of (a), wherein coagulant and starter culture are typically added at the same time to the precursor, although coagulant may also be added to the precursor prior to (a) or to the inoculated precursor after (a). Any coagulant known in the art is suitable, which include animal rennet, microbial coagulant, fermentation produced chymosin, acids and salts (especially calcium chloride). Preferably, rennet or microbial coagulant (such as obtained from *Rhizomucor miehei*) is used as coagulant.

During (a), multiple bacterial strains are added to the precursor. Such addition of multiple bacterial strains may occur simultaneously, i.e. a mixture of strains is added to the precursor, or consecutively, i.e. the bacterial strains are added in two or more batches to the precursor. All bacterial strains that are added to the precursor are together referred to as the starter culture, irrespective if the strains are added in one go or in separate portions. It should be noted that rennet is not part of the starter culture. Step (a) may thus comprise multiple additions of bacterial strains to the precursor. The starter culture that is added in (a) is further defined below.

The method of producing curd according to the invention may comprise further processing of the curd formed in (a), preferably for producing curd that is ready to be used in a method for producing cheese, preferably the method according to the fourth aspect of the invention. Such further processing typically includes cutting the curd, draining the curd, scalding the curd and/or pressing the curd. The method according to the first aspect of the invention preferably comprises (b) cutting the curd and/or (c) draining the curd, preferably the curd is at least drained. Preferably, the curd is first cut (b) and the cut curd is then drained from the cheese precursor (c), although draining may also occur prior to cutting. The drained and preferably cut curd is preferably subjected to scalding, wherein the curd is "cooked" or "scalded", and/or a pressing, wherein the curd is pressed. Pressing of the curd typically occurs after scalding. The cooking temperature during the scalding may range from 30-55° C., such as in the range of 32-45° C., preferably 35-37° C. for Maasdam-type cheese whilst the cooking temperature for Emmental-type cheese is typically in the range of 46-55° C., preferably 50-53° C. This difference in cooking temperature affords the characteristic difference between Maasdam-type and Emmental-type cheeses, as it results in a significant difference in moisture content of the cooked curds. Most preferably, the method of producing curd according to the first aspect of the invention comprises cutting the curd, draining the curd, scalding the curd and pressing the curd, as described here above. In a preferred embodiment, the method of producing curd according to the invention does not comprise a step of nitrate rinsing of the curd and/or nitrate addition to the precursor. In a further preferred embodiment, the method of producing curd according to the invention does not comprise a step of bactofugation of the precursor. Most preferably, the method of producing curd according to the invention does not comprise the steps of nitrate rinsing of the curd, nitrate addition to the precursor and bactofugation of the precursor.

The precursor may be any substrate known in the art to be suitable for making curd and cheese from the curd. The precursor may also be referred to as "curd precursor" or "cheese precursor". Typically, the precursor is milk, e.g. cow's milk, goat's milk, buffalo's milk, sheep's milk. Mixtures of milk may also be used as cheese precursor. Preferably, the cheese precursor comprises cow's milk, most preferably the cheese precursor is cow's milk. The cheese precursor is preferably pasteurized, although raw milk is also suitable. Alternatively, although less preferred, the cheese precursor may already comprise curd, to which the starter culture according to the invention is added. Thus, the precursor preferably comprises milk and/or curd.

Starter Culture

The use of starter cultures for making curd or cheese is known in the art. The starter culture according to the invention, that is used to inoculate the precursor in the method according to the first aspect of the invention, is typically in frozen, freeze-dried or spray-dried from, preferably in frozen form, and comprises dairy Propionibacteria, a strain of lactic acid bacteria and a source of lacticin. In a preferred embodiment, the strain of lactic acid bacteria is capable of producing lacticin, as described further below. In this embodiment, the strain of lactic acid bacteria comprises or is the source of lacticin, and the starter culture according to the invention preferably does not comprise a separate source of lacticin in addition to a strain of lactic acid bacteria capable of producing lacticin. Alternatively, the starter culture according to the invention comprises a strain of lactic acid bacteria and a separate source of lacticin as described further below. The starter culture according to the invention preferably has an optimal temperature for growth in milk, optionally supplemented with yeast extract, in the range of 20-45° C., more preferably of from 25-43° C.

Dairy Propionibacteria are known in the art to be suitable as starter culture in the formation of Swiss-type cheeses, and may be defined as Gram positive, non-spore-forming, non-motile pleomorphic rods capable of forming propionic acid as an end product of their metabolism. Dairy Propionibacteria include, preferably are one or more bacteria selected from the group consisting of, *P. acidipropionici*, *P. cyclohexanicum*, *P. freudenreichii* subsp, *P. jensenii*, *P. microaerophilum*, and *P. thoenii*. Further guidance can be found in Cousin et al., *Dairy Sci. Technol.*, 2011, 91, 1-26. The *P. freudenreichii* subsp. are preferred species of dairy Propionibacteria and preferably these are selected from the group consisting of *P. freudenreichii* subsp. *freudenreichii* and *P. freudenreichii* subsp. *shermanii*. Most preferably, the dairy Propionibacteria comprised in the starter culture according to the invention are selected from a strain of *P. johnsonii*, a strain of *P. freudenreichii* subsp. *freudenreichii* and a strain of *P. freudenreichii* subsp. *shermanii* and mixtures thereof.

The dairy Propionibacteria that are comprised in the starter culture according to the invention are preferably characterized by having a MIC value of 5 mg or higher, more preferably 10 mg or higher, even more preferably 25 mg or higher, even more preferably 50 mg or higher, most preferably even 100 mg or higher for lacticin 3147 per litre of growth medium. Herein, the term MIC has its common meaning of "minimal inhibitory concentration" and is the lowest concentration of an antimicrobial (in the present case lacticin 3147) that will inhibit the visible growth of a microorganism after overnight incubation. MIC values for lacticin 3147 or other bacteriocins are typically determined according to the following test: *Propionibacterium* strains are grown from an individual colony for 2-3 nights (SLA, 30° C., anaerobically) until turbid. 3% inoculum is subbed into fresh SLA medium and incubated for approx. 7 hours until OD600 0.5 is reached. Of the resulting culture, $10^5$ cfu/ml is inoculated into 96 wells microtitreplates containing fresh SLA medium comprising lacticin 3147, or other bacteriocin, ranging in concentrations from 100 mg/L to 0.01 mg/L (high concentrations to the left, low concentrations to the right). Growth following incubation at 30° C. anaerobically for 19-24 hours is visually evaluated by inspecting turbidity from left to right. MIC values are determined according to the last well where no visible growth is observed (average of triplicate determinations). The above protocol under appropriate growth conditions can be used to obtain MIC values of other strains, e.g. of Lactoabacilli, *Clostridia*, etc., against lacticin 3147 or other bacteriocins such as nisin. Interestingly, as further detailed in example 1, all of the four strains of *Propionibacterium freudenreichii* tested had a MIC value >5 mg/L lacticin 3147 and 3 out of 4 of the tested strains had a MIC value >50 mg/L lacticin 3147. At the same time MIC values against nisin were at least 20 times lower.

Preferably, the amount of dairy Propionibacteria comprised in the starter culture is such that in (a) at least $10^2$ cfu dairy Propionibacteria are added to 1 gram of precursor, more preferably $1·10^3$-$1·10^8$ cfu/g precursor most preferably $1·10^4$-$1·10^7$ cfu/g precursor. It should be noted that the starter culture according to the invention preferably and effectively uses unmodified or native Propionibacteria as the dairy Propionibacteria, in that they preferably are not capable of producing lacticin by incorporation of a plasmid nor are they preferably desensitised or adapted towards any bacteriocin, especially towards nisin or lacticin.

The starter culture comprises a strain of lactic acid bacteria. Lactic acid bacteria are known in the art and may be defined as Gram positive, non-spore-forming, anaerobic, catalase negative cocci or rods forming lactic acid as an end product of their carbohydrate metabolism. Well-known genera include *Bifidobacterium, Carnobacterium, Enterococcus, Lactobacillus, Lactococcus, Lactospaera, Leuconostoc, Oenococcus, Pediococcus, Streptococcus, Vagococcus* and *Weissella*. During their growth, lactic acid bacteria may form metabolites other than lactic acid. These metabolites may contribute to the desired sensory properties of the product. Some of these metabolites may include, for instance, diacetyl, acetaldehyde and exopolysaccharides. Preferred strains of lactic acid bacteria to be included in the starter culture according to the invention include *Lactococcus lactis* and *Streptococcus thermophilus*. Preferably, the strain of lactic acid bacteria is a strain of *L. lactis* and/or a strain of *S. thermophilus*. In a preferred embodiment, the strain of lactic acid bacteria is used as source of lacticin, wherein the strain is capable of producing lacticin, most preferably the starter culture comprises *L. lactis* capable of producing lacticin as strain of lactic acid bacteria and as source of lacticin. Most preferably, the source of lacticin comprises a strain of *Lactococcus lactis* subsp. capable of producing lacticin 3147, more preferably comprising plasmid pMRC01.

The starter culture also comprises a source of lacticin, preferably a source of lacticin 3147 and/or 481, most preferably a source of lacticin 3147. Since lacticin 3147 is the preferred lacticin in the context of the present invention, all said herein about lacticin in general equally applies to specifically lacticin 3147. The bacteriocin activity of lacticin 3147 is known from e.g. WO 96/32482 or WO 99/67287 (both being incorporated by reference herein) and Callanan and Ross in Cheese: Chemistry, Physics and Microbiology, Third edition—Volume 1: General Aspects, 2004, 153-154, and that of the lacticin 481 from e.g. Dufour et al. *FEMS Microbiol. Rev.* 2007, 134-167. As lacticin is known to be active against most Gram-positive bacteria, it was surprising that the presence of lacticin still allowed for activity of dairy Propionibacteria in the curd making process according to the invention. And the more so since lacticin 3147 has been described to be effective against skin Propionibacteria, see WO 99/66949. The inventors also surprisingly found that the presence of lacticin still allowed for the dairy Propionibacteria, even when not capable of producing lacticin themselves, to be active in the curd making process according to the invention. Also some *Lactobacillus* species were surprisingly unaffected by the presence of lacticin. Preferably, the source of lacticin is a bacterial strain, more preferably a lactic acid bacterial strain, most preferably a lactococcal strain, which is capable of producing lacticin, preferably lacticin 3147. The bacterial strain capable of producing lacticin is preferably a strain of *Lactococcus lactis* subsp., most preferably most preferably a strain of *L. lactis* subsp. *lactis*, a strain of *L. lactis* subsp. *cremoris* or a strain of *L. lactis* subsp. *lactis* biovar. *diacetylactis*. Typically, the strain is capable of producing lacticin by virtue of the incorporation of a plasmid. A suitable plasmid to be used in this respect is pMRC01. Techniques to create such lacticin producing lactic acid bacterial strains are known in the art, see e.g. WO 96/32482. Thus, the source of lacticin is preferably a bacterial strain, more preferably a lactic acid bacterial strain, even more preferably a lactococcal strain, containing plasmid pMRC01. Preferably, a strain of *Lactococcus lactis* subsp. is used as source of lacticin, more preferably a strain of *L. lactis* subsp. *lactis*, a strain of *L. lactis* subsp. *cremoris* or a strain of *L. lactis* subsp. *lactis* biovar. *diacetylactis*, which is capable of producing lacticin, most preferably lacticin 3147, and wherein said strain of *Lactococcus lactis* subsp. preferably comprises plasmid pMRC01.

In a preferred embodiment, the starter culture comprises a strain of *Lactococcus lactis* subsp. capable of producing lacticin, especially lacticin 3147, and a strain of dairy Propionibacteria. Thus, the starter culture herein comprises *Lactococcus lactis* subsp. as the strain of lactic acid bacteria and the source of a lacticin. Herein, said lactococcal strain preferably comprises plasmid pMRC01 and the strain of dairy Propionibacteria preferably comprises a strain of *Propionibacterium freudenreichii* subsp. or a strain of *Propionibacterium johnsonii* or a mixture thereof. Such a starter culture is preferably employed in the preparation of Maasdam-type cheese. The starter culture may further comprise a flavour adjunct culture, such as a strain of *Lactobacillus*, especially a strain of *Lactobacillus helveticus* and/or a strain of *Lactobacillus acidophilus*. In the present embodiment the starter culture—optionally excluding any strain of *Lactobacillus* subsp.—preferably has an optimal temperature for growth in milk, optionally supplied with yeast extract, in the range of 20-37° C., more preferably of from 25-35° C., most preferably of from 25-30° C.

In another embodiment for preparing Maasdam-type cheese, the starter culture comprises a strain of *Lactococcus lactis* subsp. capable of producing lacticin, especially lacticin 3147, a strain of dairy Propionibacteria, and a strain of *Lactobacillus delbrueckii* subsp, preferably a strain of *Lactobacillus delbrueckii* subsp. *lactis*. The incorporation of a strain of *Lactobacillus delbrueckii* is especially favourable if still some nitrate is used in the method for preparing cheese, and/or if the texture of a traditional Maasdam-type cheese is desired. Herein, the lactococcal strain preferably comprises plasmid pMRC01 and the strain of dairy Propionibacteria preferably comprises a strain of *Propionibacterium freudenreichii* subsp. or a strain of *Propionibacterium johnsonii* or a mixture thereof. In the present embodiment the starter culture—optionally excluding any strain of *Lactobacillus* subsp.—preferably has an optimal temperature for growth in milk, optionally supplied with yeast extract, in the range of 20-37° C., more preferably of from 25-35° C., most preferably of from 25-30° C.

In another preferred embodiment, the starter culture comprises a strain of *Lactococcus lactis* subsp. capable of producing lacticin, especially lacticin 3147, a strain of dairy Propionibacteria, and a strain of *Streptococcus thermophilus*. The presence of one or more strains of *Lactobacillus* capable of metabolising galactose is especially preferred when using a starter culture comprising *S. thermophilus*. In one embodiment, the starter culture further comprises a strain of *Lactobacillus delbrueckii* subsp., preferably a strain of *Lb. delbrueckii* subsp. *lactis*. In one embodiment, the starter culture further comprises a strain of *Lactobacillus helveticus*. In one embodiment, the starter culture further comprises a strain of *Lactobacillus acidophilus*. In one embodiment, the starter culture further comprises a strain of *Lb. helveticus* and a strain of *Lb. acidophilus*. In one embodiment, the starter culture further comprises a strain of *Lb. helveticus* and optionally a strain of *Lactobacillus acidophilus*. It is thus preferred that the starter culture comprises one or more strains selected from *Lb. delbrueckii* subsp. *lactis*, *Lb. acidophilus* and *Lb. helveticus*. The present embodiment, wherein the starter culture comprises a strain of *Streptococcus thermophilus*, is especially preferred in the preparation of Emmental-type cheeses. Herein, the starter culture has an optimal temperature for growth in milk, optionally supplied with yeast extract, of above 37° C. such as 40-43° C.

In a preferred embodiment, the starter culture does not comprise large amounts of a nisin source. Large amounts of nisin being present during the processes according to the present invention is undesirable, as nisin is known to inhibit the activity of dairy Propionibacteria, see e.g. in EP 2165608. Thus, it is preferred that the dairy Propionibacteria are exposed to a nisin concentration of less than 50 IU per gram of the cheese precursor, more preferably less than 25 IU per gram, even more preferably less than 10 IU per gram, most preferably they are exposed to no nisin. It is thus preferred that the starter culture does not comprise a source of nisin, or alternatively it is preferred that the starter culture does not comprise an added source of nisin. In this respect, it is also preferred that the starter culture does not comprise a source of a plantaricin or more generally of a class IIa bacteriocin or at least does not comprise an added source of a plantaricin or more generally of a class IIa bacteriocin. Preferably, no source of nisin and of a plantaricin or at least no added source of nisin and of a plantaricin are present in the starter culture. Most preferably, no source of nisin and of a class IIa bacteriocins or at least no added source of nisin and of a class IIa bacteriocins, especially of a plantaricin, are present in the starter culture.

Although means to desensitise dairy Propionibacteria to nisin are known, e.g. as described in EP 1273273, the inventors found that such nisin or other bacteriocin desensitisation is not required when a source of lacticin is used according to the invention. Thus, the dairy Propionibacteria are preferably defined as being are capable of losing at least 50%, more preferably at least 75%, of their viable cell count or metabolic activity when incubated at a suitable growth temperature in a suitable liquid growth medium comprising 50 IU of nisin per gram of growth medium, as compared with a reference experiment wherein said growth medium comprises no nisin and all other experimental conditions are maintained.

The starter culture according to the invention may comprise further bacteria, especially further lactic acid bacteria, more preferably the starter culture further comprises one or more strains of *Lactobacillus*. In one embodiment, the starter culture further comprises a strain of *S. thermophilus*, especially when the starter culture is used or intended to be used in a process for making Emmental-type cheese. The strain of *S. thermophilus* is preferably adapted to lacticin, more preferably is adapted to at least the level of lacticin that is present in the present method of producing curd. In one embodiment, the starter culture further comprises a strain of *Lactobacillus delbrueckii* subsp., preferably a strain of *Lb. delbrueckii* subsp. *lactis*. The strain of *Lb. delbrueckii* may be adapted to lacticin, preferably to at least the level of lacticin that is present in the present method of producing curd. However, it was found that some strains of *Lb. delbrueckii* are sufficiently resistant against lacticin 3147 to suitably be used in the present invention. In one embodiment, the starter culture further comprises a strain of *Lactobacillus helveticus* and/or a strain of *Lactobacillus acidophilus*. In one embodiment, the starter culture further comprises a strain of *Lb. helveticus*. In one embodiment, the starter culture further comprises a strain of *Lb. acidophilus*. In one embodiment, the starter culture further comprises a strain of *Lb. helveticus* and a strain of *Lb. acidophilus*. It is thus preferred that the starter culture comprises one or more strains selected from *Lb. delbrueckii* subsp. *lactis*, *Lb. acidophilus* and *Lb. helveticus*.

The starter culture according to the invention may be a single composition, i.e. a mixture of the essential and optionally the preferred components described above. Such a single composition is then used to inoculate the precursor in (a) of the process according to the first aspect of the invention. Alternatively, the different components may be added in two or more distinct portions to the precursor in (a). Even if two or more distinct portions are used to add the components of the starter culture of the invention to the precursor, the components are together still referred to as a starter culture in the context of the present invention. It is preferred that the starter culture is added in at least two or three distinct portions, a first portion comprising the strain of lactic acid bacteria capable of producing lacticin (i.e. the source of lacticin), optionally a second portion comprising the one or more strains of *Lactobacillus*, and a last portion comprising the dairy Propionibacteria. In case the starter culture has an optimal temperature for growth in milk, optionally supplied with yeast extract, of above 37° C. such as 40-43° C., the starter culture is preferably added in at least three distinct portions, a first portion comprising the strain of lactic acid bacteria capable of producing lacticin (i.e. the source of lacticin), optionally a portion comprising the one or more strains of *Lactobacillus*, a portion comprising the dairy Propionibacteria and a last portion comprising a strain of *Streptococcus thermophilus*.

In a second aspect, the present invention relates to the starter culture as described hereinabove. Such a starter culture is especially suitable to be used in the process according to the first aspect of the invention. The invention thus also relates to the use of the starter culture according to the invention for the manufacture of curd and/or cheese, preferably Swiss-type cheese.

Curd

The method according to the first aspect of the invention produces curd that is distinct from prior art curds. Hence, in a third aspect the invention relates to curd, preferably curd obtainable by the method according to the first aspect of the invention, most preferably to curd obtained thereby. The curd according to the invention is especially suitable to be used in the manufacture of cheese, especially Swiss-type cheese. The curd is typically characterized by comprising viable dairy Propionibacteria and/or fragments of dairy Propionibacteria. Such fragments preferably include DNA fragments of dairy Propionibacteria, as those are readily recognizable as belonging to the original dairy Propionibacteria that were present in the starter culture according to the invention. The curd preferably comprises at least $10^2$ cfu viable dairy Propionibacteria per gram, more preferably $10^3$-$10^{15}$ cfu per gram, most preferably $10^4$-$10^{12}$ cfu per gram curd. Also commonly comprised in the curd are viable lactic acid bacteria and/or fragments thereof, typically at least $10^3$ cfu viable lactic acid bacteria per gram, more preferably $10^6$-$10^{15}$ cfu per gram, most preferably $10^8$-$10^{12}$ cfu per gram curd. Also comprised in the curd according to the invention may be viable bacteria or fragments thereof of further bacterial strains that may be included in the starter culture according to the invention, such as *Lactobacillus delbrueckii* subsp., *Lactobacillus helveticus*, or *Lactobacillus acidophilus*. In addition to viable dairy Propionibacteria and/or fragments of dairy Propionibacteria the curd further comprises traces of lacticin It has been experimentally shown that amounts of lacticin can be produced in cheese, prepared from the curd according to the invention, which are sufficient to prevent proliferation of spores of *Clostridium tyrobutyricum* (tests involving overlays of $10^2$ spores on curd plugs). The curd according to the invention typically comprises at least 0.1 mg lacticin (typically lacticin 3147) per kg curd, preferably at least 0.5 mg/kg, most preferably at least 1.0 mg/kg or even at least 2.5 mg/kg. The curd according to the invention typically comprises up to 1000 mg lacticin (typically lacticin 3147) per kg curd, preferably up to 200 mg/kg, more preferably up to 50 mg/kg, or even up to 5 mg/kg. Thus, preferred ranges of the lacticin (typically lacticin 3147) content in the curd are 0.1-1000 mg/kg, more preferably 0.5-200 mg/kg, even more preferably 1.0-50 mg/kg, most preferably 2.5-5 mg/kg. In case a bacterial strain capable of producing lacticin is used as source of lacticin, the curd according to the invention comprises viable bacteria of said strain and/or fragments thereof. Such fragments preferably include DNA fragments of the bacterial strain, as those are readily recognizable as belonging to the original lacticin-producing bacterial strain that was present in the starter culture according to the invention. The curd preferably comprises at least $10^3$ cfu viable bacteria capable of producing lacticin (typically lacticin 3147) per gram, more preferably $10^6$-$10^{15}$ cfu per gram, most preferably $10^8$-$10^{12}$ cfu per gram curd.

According to a preferred aspect of the starter culture of the invention, no large amount of a source of nisin is comprised therein. Thus, it is preferred that the curd according to the invention does not comprise substantial amounts of nisin, such as less than 50 IU nisin per gram of the curd, more preferably less than 25 IU/g, most preferably less than 10 IU/g. It is also preferred that the curd according to the invention does not comprise substantial amounts of plantaricin, more preferably of any type IIa bacteriocin, which is not effective to prevent outgrowth of *Listeria monocytogenes*, such as less than 50 IU plantaricin per gram of the curd, more preferably less than 25 IU/g, most preferably less than 10 IU/g, and typically less than 50 IU type IIa bacteriocin per gram of the curd, more preferably less than 25 IU/g, most preferably less than 10 IU/g. In one embodiment, the curd according to the invention has a content type IIa bacteriocin, or a content of plantaricin, which is substantially non-effective against *Listeria monocytogenes* subsp. Most preferably, the curd according to the invention has a nisin content of less than 50 IU/g, more preferably of less than 10 IU/g, most preferably of less than 5 or even less than 1 IU/g. Alternatively or additionally a type IIa bacteriocin is not present in detectable amounts or at least not in amounts which have a listericidal effect (e.g., no halo observable in overlay experiments of *Listeria monocytogenes* Scott A on cheese plugs).

The invention also relates to the use of the curd according to the invention in the production of cheese, preferably Swiss-type cheese.

Process for Making Cheese

In a fourth aspect, the invention relates to a method for producing cheese from the curd according to the invention. The method according to this aspect of the invention which comprises (d) manufacturing cheese from the curd according to the invention, preferably from the curd obtained by the method of the first aspect of the invention. The method for making cheese is preferably for making Swiss-type cheese. Swiss-type cheeses are characterized by inoculating a precursor, typically milk, with dairy Propionibacteria in the preparation of the curd. In the context of the present invention, Swiss-type cheeses includes any type of cheese manufactured in the presence of dairy Propionibacteria, preferably the cheese is of Emmental-type or Maasdam-type as discussed above, most preferably of the Maasdam-type. The cheese is preferably of the brined type. Preferably, the cheese has eyes, more preferably at least 1 vol % of the cheese is formed by eyes, yet more preferably at least 3 vol % of the cheese is formed by eyes, even more preferably at least 5 vol % of the cheese is formed by eyes and even more than 10 vol % of the cheese may be formed by eyes. Cheeses obtained by the method according to the fourth aspect of the invention are further described below.

Methods for making cheese from curd are well-known in the art, and the present invention covers all known variants thereof, as long as the curd is obtained by inoculation with a starter culture comprising dairy Propionibacteria, a strain of lactic acid bacteria and a source of lacticin. The skilled person may find further guidance in Fröhlich-Wyder and Bachmann in Cheese, volume 2, 2004, 141-156. Step (d) typically comprises pressing and shaping the curd, adding salt to the curd to form green cheese, preferably vacuum packaging the green cheese in a foil or providing the green cheese with a cheese coating, and ripening the optionally foil-packed or coated green cheese. More specifically, (d) includes (i) warming the curd (scalding), (ii) pressing and shaping the curd, e.g. in moulds, (iii) adding salt to the curd, suitably by adding salt to curd particles before pressing and shaping, e.g. as in cheddar manufacturing, or, in the context of the present invention most preferably, by soaking the pressed and shaped curds in a brine bath, to form green cheese. Thus, scalding and pressing the curd, as described above for the method according to the first aspect of the invention, are part of (d). Thus, the curd according to the invention is preferably subjected to scalding (i), wherein the curd is "cooked" or "scalded", and/or a pressing (ii), wherein the curd is pressed. Pressing of the curd typically occurs after scalding. The cooking temperature during scalding (i) may range from 30-55° C., such as in the range of 32-45° C., preferably 35-37° C. for Maasdam-type cheese whilst the cooking temperature for Emmental-type cheese is typically in the range of 46-55° C., preferably 50-53° C. The green cheese is (iv) preferably vacuum packed in a foil or provided with a cheese coating. The optionally foil-packed or coated green cheese is (v) preferably ripened, typically 4 weeks-1 year and preferably at a temperature of 4-30° C. The ripening step most preferably includes a stage wherein the temperature is set to between 18-30° C., more preferably 20-28° C., most preferably 20-24° C. in order to activate the propionic acid fermentation. The skilled person knows which steps to perform and how to perform them when manufacturing a cheese from cheese curd. In a preferred embodiment, the method of producing cheese according to the invention does not comprise a step of nitrate rinsing of the curd.

Cheese

The method according to the fourth aspect of the invention produces cheese that is distinct from prior art cheeses. Hence, in a fifth aspect the invention relates to cheese, preferably cheese obtainable by the method according to the fourth aspect of the invention, most preferably to cheese obtained thereby. The cheese according to the invention preferably is Swiss-type cheese, more preferably cheese of the Emmental-type, i.e. hard cheese with eyes, or Maasdam-type, i.e. semi-hard cheese with eyes. Most preferably, the cheese according to the invention is Maasdam-type cheese. Typically, cheese according to the present invention has eyes which are formed by virtue of the inoculation with and subsequent fermentation of the dairy Propionibacteria, which produces gasses such as $CO_2$ that form eyes. The cheese is preferably of the brined type. Preferably, the cheese has eyes, more preferably at least 1 vol % of the cheese is formed by eyes, yet more preferably at least 3 vol % of the cheese is formed by eyes, even more preferably at least 5 vol % of the cheese is formed by eyes and even more than 10 vol % of the cheese may be formed by eyes.

The cheese according to the invention is typically characterized by comprising viable dairy Propionibacteria and/or fragments of dairy Propionibacteria. Such fragments preferably include DNA fragments of dairy Propionibacteria, as those are readily recognizable as belonging to the original dairy Propionibacteria that were present in the starter culture according to the invention. The cheese preferably comprises at least $10^3$ cfu dairy Propionibacteria per gram, more preferably $10^6$-$10^{15}$ cfu per gram, most preferably $10^8$-$10^{12}$ cfu per gram cheese. Also commonly comprised in the cheese according to the invention are viable lactic acid bacteria and/or fragments thereof, typically at least $10^3$ cfu viable lactic acid bacteria per gram, more preferably $10^6$-$10^{15}$ cfu per gram, most preferably $10^8$-$10^{12}$ cfu per gram cheese. Also comprised in the cheese according to the invention may be viable bacteria or fragments thereof of further bacterial strains that may be included in the starter culture according to the invention, such as *Lactobacillus delbrueckii* subsp., *Lactobacillus helveticus*, and *Lactobacillus acidophilus*. The cheese typically further comprises traces of lacticin sufficient to prevent proliferation of spores of *Clostridium tyrobutyricum* (tests involving overlays of $10^2$ spores on cheese plugs, halo size ≥1 mm). The cheese according to the invention typically comprises at least 0.1 mg lacticin (typically lacticin 3147) per kg cheese, preferably at least 0.5 mg/kg, most preferably at least 1.0 mg/kg or even at least 2.5 mg/kg. The cheese according to the invention typically comprises up to 1000 mg lacticin (typically lacticin 3147) per kg cheese, preferably up to 200 mg/kg, more preferably up to 50 mg/kg, or even up to 5 mg/kg. Thus, preferred ranges of the lacticin (typically lacticin 3147) content in the cheese are 0.1-1000 mg/kg, more preferably 0.5-200 mg/kg, even more preferably 1.0-50 mg/kg, most preferably 2.5-5 mg/kg. In case a bacterial strain capable of producing lacticin is used as source of lacticin, the cheese according to the invention comprises viable bacteria of said strain and/or fragments thereof. Such fragments preferably include DNA fragments of the bacterial strain, as those are readily recognizable as belonging to the original lacticin-producing bacterial strain that was present in the starter culture according to the invention. The cheese preferably comprises at least $10^3$ cfu viable bacteria capable of producing lacticin (typically lacticin 3147) per gram, more preferably $10^6$-$10^{15}$ cfu per gram, most preferably $10^8$-$10^{12}$ cfu per gram cheese.

The cheese according to the present invention is preferably characterized in that it comprises, typically after a work-up with a strong acid, a concentration of propionic acid which is higher than the concentration of butanoic acid (butyric acid). Additionally or alternatively, the cheese according to the present invention, typically after a work-up with a strong acid, comprises at least 1000 ppm of propionic acid, more preferably at least 3000 ppm of propionic acid, most preferably at least 5000 ppm of propionic acid. The concentrations of propionic acid and of butanoic acid are herein conveniently measured using HPLC, as exemplified in Example 4. Work-up with strong acid typically involves distillation in 5 ml of 10% sulphuric acid, 1 ml of valeric acid at a concentration of 10 mg per $ml^{-1}$ and 10 ml of distilled water (see Example 4).

According to a preferred aspect of the starter culture of the invention and of the curd according to the invention, no large amount of a source of nisin is comprised therein. Thus the cheese according to the invention preferably has a nisin content of less than 50 IU/g, more preferably of less than 10 IU/g, most preferably of less than 5 or even less than 1 IU/g. Alternatively or additionally a type IIa bacteriocin is not present in the cheese in detectable amounts or at least not in amounts which have a listericidal effect (no halo in overlay experiments of *Listeria monocytogenes* Scott A on cheese plugs).

EXAMPLES

Strain Construction and Analytical Tests

Strain Construction:

The conjugation method of Coakley et al. (*Applied and environmental microbiology,* 1997, 63, 1434-1440) was used to generate lacticin or nisin transconjugants, with slight modifications. Inoculums (2%) of both donor and recipient were grown for four hours in GM17 broth at 30° C. After the growth period, 1 ml of recipient and 1 ml of donor were harvested and washed twice with GM17 broth. After the final wash, each strain was resuspended in 50 µl of GM17 broth. The concentrated recipient and donor (20×) were then mixed with each other at the following ratios, 1:1, 2:1 and 20:1. Each mixture was spotted onto the centre of a GM17 agar plate and incubated overnight at 30° C. The following day, spots were harvested in 1 ml of maximum recovery diluent (MRD; Oxoid) and serially diluted before plating on lactose indicator agar (LIA) containing lacticin (400 arbitrary units (AU)/ml) as described by Coakley et al. Following 48 hours of incubation at 30° C. the lacticin-containing LIA plates were examined for lactose-positive colonies (yellow) against a background of lactose-negative colonies (white), lactose-positive colonies were selected for further analysis. Nisin transconjugants were generated essentially as described above; selection was performed in 10% reconstituted skim milk containing 400 AU/ml nisin before plating on nisin-LIA plates.

Accordingly, CSK 1417, a strain of *Lactococcus lactis* subsp. *lactis* biovar *diacetylactis* with phenotype lactose$^+$ cit$^+$ nis$^{np}$ nis$^{sens}$ lacticin$^{np}$ lacticin$^{sens}$ was transformed using in derivative CSK 3652 containing plasmid pMRC01 and having phenotype lactose$^+$ cit$^+$ nis$^{np}$ nis$^{sens}$ lacticin$^p$ lacticin$^{iim}$. Also further strains were produced using this protocol. The strains produced and/or used in the present study are summarized in Table 1.

TABLE 1

List of strains

| Taxonomy | Subsp. | ID | Phenotype |
|---|---|---|---|
| Lactococcus lactis | lactis | CSK 2775 | Bac$^-$ (producing no bacteriocin) |
| | | CSK 3594 | Lacticin-producing, lacticin immune derivative CSK 2775; Ltn$^+$ |
| | | CSK 3281 | Nisin-producing, nisin immune derivative CSK 2775; Nis$^+$ |
| Lactococcus lactis | cremoris | CSK 3834 | Bac$^-$ |
| | | CSK 4555 | Lacticin-producing, lacticin immune derivative CSK 3834; Ltn$^+$ |
| | | CSK 65 | Nisin-producing, nisin immune derivative CSK 3834; Nis$^+$ |
| Lactococcus lactis | lactis biovar diacetylactis | CSK 1417 | Bac$^-$ |
| | | CSK 3652 | Lacticin-producing, lacticin immune derivative CSK 1417; Ltn$^+$ |
| | | CSK 3039 | Nisin-producing, nisin immune derivative CSK 1417; Nis$^+$ |

Colony Mass Spectrometry:

Colony mass spectrometry was performed by mixing a loopful of colonies with 50 µl of 70% isopropanol, 0.1% trifluoroacetic acid (TFA). The suspension was mixed by vortexing; cells were then harvested in a benchtop centrifuge at 14000 rpm for 2 minutes. Mass spectrometry of the supernatant was performed with an Axima TOF$^2$ MALDI TOF mass spectrometer (Shimadzu Biotech, Manchester, UK). A 0.5-µl aliquot of matrix solution (alpha-cyano-4-hydroxy cinnamic acid (CHCA), 10 mg/ml in 50% acetonitrile-0.1% (v/v) TFA) was deposited onto the target and left for 1-2 minutes before removal. The residual solution remaining was allowed air-dry and the sample solution was deposited onto the pre-coated sample spot. Matrix solution (0.5-µl) of was added to the deposited sample and allowed air-dry. The sample was subsequently analysed in positive-ion reflection mode.

PCR Scan:

Genomic DNA was extracted from 1.5 ml of overnight culture according to the method of Hoffman and Winston (*Gene*, 1987, 57, 267-272) slightly modified as described by Mills et al. (*Journal of applied microbiology*, 2010, 108, 945-955). Primer sets used to scan strains for the presence of pMRC01 as well as the genes associated with nisin production are listed in Table 2. PCR was performed in a Hybaid PCR express unit (Hybaid Ltd., Middlesex, UK) using MyTaq™ Red Mix polymerase (Bioline Ltd., London, U.K.) according to manufacturers' specifications combined with an annealing temperature of 55° C.

TABLE 2

List of primers

| Primer | Sequence | Target gene(s) | Size (bp) |
|---|---|---|---|
| 27-F | 5'-GGGGAACAATCTTACCTA | orf 27 | 326 |
| 27-R | 5'-ATTATTTTTATTGCATTCTACTA | | |
| 49-F | 5'-CCAATACCCGCCAAAATAAAGT | orf 49 | 347 |
| 49-R | 5'-CTAAGCGCAGAGGAAATACAACC | | |
| 51-F | 5'-TTCTCAAAATCATCAAAATCAAGT | orf51 | 293 |
| 51-R | 5'-GTACGAACAGGAGCGAAAAA | | |
| 52-F | 5'-CCTAAGTTGTCTATTCGTGTCCA | orf52 | 210 |
| 52-R | 5'-ATTAGGTGAGTGCTCTGATTTTTC | | |
| nisA-F | 5'-CAAAAGATTTTAACTTGGATTTG | nisA | 163 |
| nisA-R | 5'-ACGTGAATACTACAATGACAAG | | |
| nisFG-F | 5'-GGTTTAATTTCTGCAGATACTG | nisFEG | 1573 |

Plasmid Profile:

Plasmid DNA was isolated according to the method of O'Sullivan and Klaenhammer (*Applied and environmental microbiology*, 1993 59, 2730-2733) using 5 ml of overnight culture. The resulting DNA was resuspended in 40 µl of distilled sterile H$_2$O and run on a 0.7% agarose gel at 20 volts for 20 hours at room temperature.

Pulsed Field Gel Electrophoresis:

Pulsed field gel electrophoresis (PFGE) was performed according to Mills et al. (*Journal of microbiological methods*, 2007, 70, 159-164). DNA fragments were run on a CHEF-DR III pulsed-field system (Bio-Rad laboratories, California, USA) at 6 V/cm for 22 hours with a 1-30 s linear ramp pulse time. Molecular size markers (N03405, N03505) were purchased from New England BioLabs (New England BioLabs, Hertfordshire, UK).

Bacteriophage Assays:

Phages were propagated according to the method outlined previously (Mills et al. *Journal of microbiological methods*, 2007, 70, 159-164). Sensitivity to bacteriophage infection was performed by the double agar layer plaque assay as described previously (Coakley et al. *Applied and environmental microbiology*, 1997, 63, 1434-1440).

Characterisation of Acid Production:

Acid production was monitored in 10% reconstituted skimmed milk (RSM) in the presence and absence of 0.1% yeast extract according to the method of Harrington and Hill (*Applied and environmental microbiology*, 1991, 57, 3405-3409).

Example 1: MIC Value Determination

MIC values were determined according to a protocol from UCC & Piper et al., *J. Antimicrob. Chemother.* 2009, 61(3), 546. The protocol was adapted for 96 wells mictrotitre plate screening. Indicator strains *Lb. delbrueckii* ssp. *lactis*, C99 (commercially available ex CSK Food Enrichment CV) and *Propionibacterium freudenreichii*, C21 (commercially available ex CSK Food Enrichment CV) were used. Growth media were MRS for C99, sodium lactate agar (SLA) for C21.

MIC value determination of propionibacteria against lacticin was performed according to the following procedure: *Propionibacterium* strains were grown, from an individual colony, for 2-3 nights (SLA, 30 deg C., anaerobically) until turbid. 3% inoculum was subbed into fresh SLA medium and incubated for approx. 7 hours until OD600 0.5 was reached. Of the resulting culture, $10^5$ cfu/ml was inoculated into 96 wells microtitreplates containing fresh SLA medium comprising lacticin 3147 ranging in concentrations from 100 mg/L to 0.01 mg/L (high concentrations to the left, low concentrations to the right). Visually evaluated growth following incubation at 30° C. anaerobically for 19-24 hours, by inspecting turbidity from left to right (i.e. starting at the highest lacticin concentrations). MIC values were determined according to the last well where no visible growth is observed (average of triplicate determinations). MIC values against nisin have be obtained similarly. The obtained MIC values are presented in Table 3.

MIC value determination of Lactobacilli against lacticin was performed according to the following procedure: *Lactobacillus* strains were grown, from an individual colony, overnight (MRS, 37 deg C., anaerobically) until turbid. 3% inoculum was subbed into fresh SLA medium and incubated for approx. 7 hours until OD600 0.5 was reached. Of the resulting culture, $10^5$ cfu/ml was inoculated into 96 wells microtitreplates containing fresh MRS medium comprising lacticin 3147 ranging in concentrations from 100 mg/L to 0.01 mg/L (high concentrations to the left, low concentrations to the right). Visually evaluated growth following incubation at 37° C. anaerobically for 19-24 hours, by inspecting turbidity from left to right (i.e. starting at the highest lacticin concentrations). MIC values were determined according to the last well where no visible growth is observed (average of triplicate determinations).

TABLE 3

MIC values

| *Propionibacteria freudenreichii* | MIC (lacticin 3147) | MIC (nisin) |
|---|---|---|
| DPC 2241 | >50 mg/L | 2.5 mg/L |
| DPC 4555 | 8.3 mg/L | 0.039 mg/L |
| CSK code 21 | >50 mg/L | 1.25 mg/L |
| CSK 1205 | >50 mg/L | 1.25 mg/L |

Approximately 10 times more lacticin 3147 is required to inhibit *Lb. delbrueckii* than nisin (results not shown). All tested Propionibacteria are resistant towards lacticin 3147 at concentrations of 5 mg/L or higher, mostly at even 50 mg/L or higher. The tested Propionibacteria are far more sensitive to nisin than to lacticin 3147 (difference by a factor of 20 or higher). *C. tyrobutyricum* is sensitive to both nisin and lacticin 3147. MIC values for different strains of *C. tyrobutyricum* were found to be in the order of 0.4-2.5 mg/L of lacticin 3147, and of 0.03-0.1 mg/L of nisin. These data demonstrate a higher selectivity of lacticin 3147 than of nisin for the inhibition of strains of *Clostridium tyrobutyricum* over Propionibacteria.

Example 2: Co-Cultivations

Cultures A-F were grown overnight in 10% reconstituted skim milk (RSM)+0.1% yeast extract at 30° C. The following day, 10% RSM+yeast extract was inoculated with 1% of either C99 or C21 (see above) and +1% of a nisin- or lacticin producing strain of *Lactococcus lactis* subsp.
A. Control: Bac– & *Lb. delbrueckii* C99
B. Lacticin test: Lact+ & *Lb. delbrueckii* C99
C. Nisin test: Nis+ & *Lb. delbrueckii* C99
D. Control: Bac– & *P. freundenreichii* C21
E. Lacticin test: Lact+ & *P. freundenreichii* C21
F. Nisin test: Nis+ & *P. freundenreichii* C21

Herein, the bacteriocin-nonproducing strain was varied as a *Lactococcus lactis* subsp. *lactis* strain CSK 2775, a *Lactococcus lactis* subsp. *cremoris* strain CSK 3834, and a *Lactococcus lactis* subsp. *lactis* biovar. *diacetylactis* strain CSK 1417. The lacticin 3147 or nisin producing strains mentioned in B/D and C/F, respectively are isogenic transconjugants of the bacteriocin-nonproducing strains mentioned in A/D.

The cultures were incubated according to an Emmental temperature profile outlined by Chamba and Prost in *Lait* 1989, 69, p.417-431, cf. FIG. 1. The profile can be summarized as follows:

| Stage | Temperature profile |
|---|---|
| 1 | 31° C. constant for 40 min |
| 2 | 31 → 53° C. (linear increase over 40 min) |
| 3 | 53° C. constant for 45 min |
| 4 | 53 → 30° C. (linear decrease over 18 h) |
| 5 | 30° C. (constant for 4 h) |

Samples were collected before and after each stage and plated on the following selective growth agars:
Propionibacteria→SLA+2 µg/ml cloxacillin;
Lactobacilli→*Lactobacillus* Selective Agar (LBS);
Lactococcus→Lactose Indicator Agar (LIA).
Results:

Each of the lacticin 3147 producing strains could be successfully co-cultivated with *Propionibacterium* CSK code 21, at a temperature of 37° C. or lower. No reductions in viability of *P. freudenreichii* C21 was observed in the presence of any of the lacticin producing strains (comparison of survival data for experiment E vs. experiment. D throughout each of the 5 stages, results not shown). By contrast, *P. freudenreichii* C21 counts decreased by 3-7 orders of magnitude in presence of each of the nisin-producing strains (maximum decrease in survival throughout each of the 5 stages, experiment F vs. experiment D). Growth of *Lactobacillus delbrueckii* subsp. *lactis* C99 was generally found to be inhibited by the nisin-producing strains but not by the lacticin-producing strains. *Clostridium tyrobutyricum* growth was inhibited by each of the nisin or lacticin producing cultures, at least until stage 2 (as evaluated by the presence of an inhibition zone). As expected, neither of the lactococcal strains survived the incubation at 53° C. Therefore the nisin or lacticin producing lactococci will be more suitable for use in a Maasdammer-type application using lower scalding temperatures. It is expected, however, that with the addition of thermophilic strains such as *S. thermophilus*, and/or by modifying the nisin or lacticin producing lactococci towards a higher heat resistance (overexpression of heat shock proteins, prior culturing on suitable media, etc.) also good Emmental cheese can be produced.

Example 3: Cheese Making

A Maasdam cheese was prepared according to the following procedure.
1. The mesophilic starter culture (CSK 3594 in combination with CSK 3652, 1:1 ratio) was grown overnight in 10% RSM using a small inoculum (0.20%) at 30° C. to ensure that the cells are viable for the cheese process the next day.
2. The next day, the starter was cooled on ice. The pH of the starter was ~4.6.
3. 1 L of pasteurized whole milk was heated to 32° C. in a sterile 2 L beaker and inoculated with 0.6% of the starter culture and 0.1% of C99 (a *Lactobacillus delbrueckii* subsp. *lactis* culture commercially available from CSK Food Enrichment CV in 10% RSM, 25 µl), and 0.1% of the *Propionibacterium* (*Propionibacterium* CSK code 21 adjunct culture in LB medium, 12.4 µl) at selected inoculum (pH).
4. 30 min after inoculation the rennet (1.8 ml of 1:10 dilution) was added and the mixture was stirred vigorously with a pipette and the pipette was left in beaker while the rennet set the milk.
5. The curd was tested for firmness and cut with a sterile knife (cleaned with ethanol) 30-45 minutes after rennet addition.
6. After a further 10 minutes, cooking was commenced by elevating the temperature slowly from 32° C. to 37° C. over a 30 minute period (increase by 2° C. every 6 min) under slow continuous mixing.
7. The pH was continuously monitored and at pH of 6.1-6.5 40% of the whey was drained (approx. 700 ml). 250 ml of water (temperature between 40-50° C.) was slowly added by mixing to obtain a final temperature of 37° C. in the cheese vat. After a further 20 minutes of mixing, all the whey/water was drained.
8. The temperature of the curd was reduced to 32° C. over a 40 minute period.
9. The curd was drained overnight and pressed into moulds of ~190 g.
10. The pH of the cheese was monitored after 24 h. The pH did not drop below 5.4.
11. The curd was weighted, cut into little pieces and salt was added at 1.3% of the total weight of curd.
12. The little pieces were pressed back together and subsequently vacuum packed.
13. The cheeses were ripened for 2 weeks at 10-13° C. and subsequently for 2 weeks at 20° C.

The cheese was produced successfully, as it contained lacticin in amounts sufficient to prevent proliferation of spores of *Clostridium tyrobutyricum* (tests involving overlays of spores on cheese plugs, halo size ≥1 mm), whilst no halo was observed in overlays of spores of *Clostridium tyrobutyricum* ($10^2$ spores/ml) on plugs of a reference cheese produced with lacticin negative strains of *Lc. lactis* and of *Lc. lactis* biovar *diacetylactis* in equal proportions and amounts. Furthermore, outgrowth of the Propionibacteria was not significantly inhibited compared with a reference cheese produced with lacticin negative strains of *Lc. lactis* and of *Lc. lactis* biovar *diacetylactis* in equal proportions and amounts. Finally, eyes were formed in the cheese after 21 days of ripening, while no eyes were formed in a reference cheese produced in the presence of lacticine negative, nisin positive strains of *Lc. lactis* and of *Lc. lactis* biovar *diacetylactis* in equal proportions and amounts.

Example 4

Nine Maasdam cheeses were prepared according to the following procedure.
1. The mesophilic starter culture was grown overnight in 10% RSM using a small inoculum (0.20%) at 30° C. to ensure that the cells are viable for the cheese process the next day.
2. The next day, the starter was cooled on ice. The pH of the starter was ~4.6.
3. 1 L of pasteurized whole milk was heated to 32° C. in a sterile 2 L beaker and inoculated with $2.5 \times 10^3$ spores/ml of *Clostridium tyrobutyricum*, using a stock solution of approx. $3 \times 10^8$ spores/ml, and with 0.6% of the starter culture and 0.1% of C99 (a *Lactobacillus delbrueckii* subsp. *lactis* culture commercially available from CSK Food Enrichment CV in 10% RSM, 25 µl), and 0.1% of the *Propionibacterium* (*Propionibacterium* CSK code 21 adjunct culture in LB medium, 12.4 µl) at selected inoculum (pH).
4. 30 min after inoculation the rennet (1.8 ml of 1:10 dilution) was added and the mixture was stirred vigorously with a pipette and the pipette was left in beaker while the rennet set the milk.
5. The curd was tested for firmness and cut with a sterile knife (cleaned with ethanol) 30-45 minutes after rennet addition.
6. After a further 10 minutes, cooking was commenced by elevating the temperature slowly from 32° C. to 37° C. over a 30 minute period (increase by 2° C. every 6 min) under slow continuous mixing.
7. The pH was continuously monitored and at pH of 6.1-6.5 40% of the whey was drained (approx. 700 ml). 250 ml of water (temperature between 40-50° C.) was slowly added by mixing to obtain a final temperature of 37° C. in the cheese vat. After a further 20 minutes of mixing, all the whey/water was drained.
8. The curd was drained overnight and pressed into moulds of ~190 g.
9. The pH of the cheese was monitored after 24 h.
10. The curd was weighted, cut into little pieces and the cheese was salted by immersing the cheese in a brine bath (containing 230 g NaCl, 0.05 wt % $CaCl_2 \cdot 2H_2O$ and lactic acid to bring the pH to 5.4, per liter boiled water) at 10-12° C. for approximately 2 h.
11. The little pieces were pressed back together and subsequently vacuum packed.
12. The cheeses were ripened for 2 weeks at 10-13° C. and subsequently for 4 weeks at 20° C.

Starter cultures A-C were used in step 1, and three cheeses were prepared from each starter culture (A1-A3, B1-B3 and C1-C3).
  A. CSK 2775 & CSK 1417 (1:1) [Bac⁻; no bacteriocin production]
  B. CSK 3594 & CSK 3652 (1:1) [Lac⁺; Lacticin-producing, lacticin immune]
  C. CSK 3281 & CSK 3039 (1:1) [Nis⁺; Nisin-producing, nisin immune]

In step 9, the pH of cheeses A were in the range of 5.03-5.35, for cheeses B in the range of 5.41-5.52, and for cheeses C in the range of 5.05-5.11. The increased pH of the Lac⁺ cheeses B is considered advantageous for the growth and activity of *Propionibacterium freudenreichii*, which are found not to grow favourably in an acidic environment.

After 35 days of ripening, the non-bacteriocin-producing cheeses A developed small slits (cracks) on their surface, which could also be seen in the section of cheese removed for plating. These slits likely result from gas production due to the proliferation of *Cl. tyrobutyricum* within the cheese, and were not observed in either the lacticin- or the nisin-producing cheeses at this stage of ripening.

After 1, 7, 14, 21, 28, 35 and 42 days of ripening, cheese samples were taking according to the following procedure: 1 g of cheese was homogenised in 9 ml of 2% sodium citrate solution. A ten-fold dilution series was subsequently made with this slurry to a dilution of $10^{-7}$. Two different methods were used to enumerate *Cl. tyrobutyricum* spores in the cheeses. These included: (a) plating on RCM agar and (b) incubating cheese dilutions in Bryant & Burkey medium. Bryant & Burkey medium contains sodium lactate, which is fermented under anaerobic conditions by *Cl. tyrobutyricum* and is used as a source of carbon and energy to produce hydrogen and $CO_2$. Additionally, the dilutions were plated on LBS agar to determine the *Lb. delbrueckii* ssp. *lactis* counts, on SLA agar (+2 µg/ml cloxacilin) to determine the *Propionibacterium freudenreichii* counts, and on LM-17 agar to determine counts of the *Lactococcus lactis* starter cultures.

The organic acid contents (acetic acid, propionic acid and butyric acid) were determined for all nine cheeses at day 42, according to the following protocol: 5 g of cheese was grated and place in a distillation tube, and added thereto was: 5 ml of 10% sulphuric acid, 1 ml of valeric acid at a concentration of 10 mg per ml$^{-1}$ and 10 ml of distilled water. The resulting mixture was distilled and 100 ml of distillate was collected. The distillate was mixed vigorously, filtered over a 0.2 µm filter and injected into the screw capped vials. All samples were run in triplicate with a blank between each sample to check for carry over. Stock solutions of all four acids (acetic, propionic, butyric and valeric) were made (40 ml, 25 mg acid per ml). Standards according to the following dilution scheme was prepared:

| Stock (ml) | 0.01N H$_2$SO$_4$ (ml) | Conc. (mg/ml) | Calibration Level |
|---|---|---|---|
| 0.25 | 4.75 | 3.125 | 1 |
| 0.5 | 4.5 | 6.25 | 2 |
| 1.0 | 4.0 | 12.5 | 3 |
| 2.0 | 3.0 | 25 | 4 |
| 3.0 | 2.0 | 37.5 | 5 |
| 4.0 | 1.0 | 50 | 6 |
| 5.0 | 0.0 | 62.5 | 7 |

These standards are then treated in a similar manner as the 5 g cheese samples. Each standard is placed in a distillation tube and added thereto was: 5 ml of 10% sulphuric acid and 10 ml of distilled water. The resulting mixture was distilled and 100 ml of distillate was collected. The distillate was mixed vigorously, filtered over a 0.2 µm filter and injected into the screw capped vials. The standards were injected from lowest to highest concentration onto HPLC column to give an appropriate standard curve. The HPLC conditions were isocratic using 0.01N sulphuric acid as the mobile phase. The flow rate was 0.7 ml/min, the run time was 50 min and the column temperature was 50° C. The injection volume for both the samples and the standards was 50 µl. Detection was carried out using UV at 220 nm. The column could be stored in 0.01N sulphuric acid.

*Cl. tyrobutyricum* Spore Counts:

Enumeration of *Cl. tyrobutyricum* spores in method (a) was performed by serially diluting the cheese slurry to 10$^{-5}$ and heat treat the (un)diluted samples at 75° C. for 10 min. The treated samples were plated on RCM agar and incubated at 37° C. for 7 days under anaerobic conditions. The results are depicted in Table 4.

Enumeration of *Cl. tyrobutyricum* spores in method (b) was performed by boiling 9 ml tubes of media to regenerate anaerobic conditions. 1 ml of 10-fold dilutions of the cheese slurry was inoculated into 9 ml of medium in tubes. 2 ml of melted paraffin (60-65° C.), previously autoclaved at 121° C. for 15 minutes, was poured into each tube, which were subsequently heated at 75° C. for 10 minutes to kill vegetative cells and to active spores. Samples were allowed to cool to room temperature before incubation at 37±2° C. for up to 7 days. After incubation, those tubes, with growth and gas production were recorded as positive. To count the spores the most probable number method (MPN) was used. The results are depicted in Table 5.

TABLE 4

*Cl. tyrobutyricum* spore counts (method (a))

| | Cheeses * | | |
|---|---|---|---|
| Day | A | B | C |
| 1 | 1.96 × 10$^2$ | 61.0 | 68.7 |
| 7 | 63.3 | 33.3 | 3.33 |
| 14 | 1.37 × 10$^2$ | 21.0 | 17.5 |
| 21 | 1.09 × 10$^4$ | 5.13 × 10$^3$ | 8.01 |
| 28 | 1.86 × 10$^5$ | 9.23 × 10$^2$ | 2.27 |
| 35 | 9.19 × 10$^5$ | 6.93 × 10$^3$ | 0 |
| 42 | 1.17 × 10$^6$ | 1.08 × 10$^3$ | 6.80 × 10$^4$ |

* *Cl. Tyrobutyricum* spore counts per gram cheese (averages over the three cheeses of each type).

TABLE 5

*Cl. tyrobutyricum* spore counts (method (b))

| | Cheeses * | | |
|---|---|---|---|
| Day | A | B | C |
| 1 | 1.38 × 10$^3$ | 18.0 | 0 |
| 7 | 4.89 × 10$^2$ | 17.6 | 0 |
| 14 | 4.84 × 10$^3$ | 18.6 | 1.00 |
| 21 | 3.20 × 10$^3$ | 40.1 | 2.03 |
| 28 | 2.20 × 10$^3$ | 52.0 | 2.60 |
| 35 | 5.14 × 10$^5$ | 32.4 | 0 |
| 42 | 9.30 × 10$^6$ | 8.70 × 10$^2$ | 47.8 |

* *Cl. Tyrobutyricum* spore counts per gram (averages over the three cheeses of each type).

The results in Table 4 indicate that the number of *Cl. tyrobutyricum* spores in the absence of any source of bacteriocin (Bac$^-$, cheeses A) rose approximately 4 orders of magnitude over 6 weeks of ripening. In the Lac$^+$ cheese B, the number of *Cl. tyrobutyricum* spores only slightly exceeded the original concentration of 2.5×10$^3$ spores/ml in the starting inoculum. During the first three weeks of ripening, the *Cl. tyrobutyricum* spore content rose approx. 1 order of magnitude and remained constant afterwards. Cheeses C comprising nisin contained the least amount of *Cl. tyrobutyricum* spores, even less than the original concentration of 2.5×10$^3$ spores/ml. In one of the three C-cheeses, a sudden proliferation of *Cl. tyrobutyricum* spores was observed at day 42. The results in Table 5 are largely in line with those in Table 4. *Cl. tyrobutyricum* spores increased in the absence of a bacteriocin-producing strain, remained more or less constant for the Lac$^+$ cheeses and decreased for the Nis$^+$ cheeses.

*Lb. delbrueckii* Ssp. *Lactis* (C99) Counts:

The results are depicted in Table 6. For cheeses A producing no bacteriocin, the counts increased slightly up to week 4 of ripening after which they declined again. In lacticin-producing cheeses B, the growth of *Lb. delbrueckii* ssp. *lactis* was inhibited in the first week of ripening, after which their counts increased rapidly up to approximately 5×10$^7$ cfu/g at day 35. The growth of *Lb. delbrueckii* ssp. *lactis* was inhibited for a longer period of time in the nisin-producing cheeses C, and a peak of 1×10$^7$ cfu/g *Lb. delbrueckii* ssp. *lactis* was observed on day 42.

TABLE 6

*Lb. delbrueckii* ssp. *lactis* spore counts

| | Cheeses * | | |
|---|---|---|---|
| Day | A | B | C |
| 1 | $1.52 \times 10^5$ | 4.09 | 0 |
| 7 | $1.30 \times 10^5$ | 0 | 0 |
| 14 | $6.74 \times 10^4$ | $9.63 \times 10^2$ | 0 |
| 21 | $3.66 \times 10^5$ | $5.88 \times 10^4$ | 9.00 |
| 28 | $1.07 \times 10^6$ | $2.92 \times 10^6$ | $4.24 \times 10^5$ |
| 35 | $1.41 \times 10^5$ | $4.56 \times 10^7$ | $2.37 \times 10^6$ |
| 42 | $8.90 \times 10^4$ | $1.41 \times 10^7$ | $7.58 \times 10^6$ |

* *Lb. delbrueckii* ssp. *lactis* spore counts per gram (averages over the three cheeses of each type).

*Propionibacterium freudenreichii* (Code 21) Counts:

The results are depicted in Table 7. Throughout the 6 weeks of ripening, Propionibacteria counts were at least 0.5 to 1 order of magnitude higher in the lacticin-producing cheeses B than in the nisin-producing cheeses C and similar to the non-bacteriocin-producing cheeses A. After day 14, when the ripening temperature was raised from 7° C. to 20° C., the Propionibacteria counts in the lacticin-producing cheeses increased by approximately 2 orders of magnitude to $1 \times 10^9$ cfu/g by day 21, while the concentration of the non-bacteriocin-producing cheeses remained at approximately $3 \times 10^7$ g/ml and the nisin-producing cheese at $1 \times 10^6$ cfu/g. At this stage of the ripening period, eyes were observed in the sections extracted for plating in one of the Bac⁻ cheeses and in all three of the Lac⁺ cheeses. Eyes were not visible in the Nis⁺ cheeses. These results are indicative for a negatively affected Propionibacteria activity in cheeses C by virtue of the presence of nisin, and not in cheeses B wherein lacticin is present.

TABLE 7

*P. freudenreichii* spore counts

| | Cheeses * | | |
|---|---|---|---|
| Day | A | B | C |
| 1 | $2.01 \times 10^6$ | $4.28 \times 10^6$ | $2.19 \times 10^5$ |
| 7 | $1.28 \times 10^7$ | $9.28 \times 10^6$ | $3.11 \times 10^6$ |
| 14 | $2.67 \times 10^6$ | $7.46 \times 10^6$ | $1.40 \times 10^6$ |
| 21 | $1.88 \times 10^7$ | $9.83 \times 10^8$ | $1.12 \times 10^6$ |
| 28 | $1.92 \times 10^8$ | $5.77 \times 10^7$ | $3.52 \times 10^6$ |
| 35 | $9.07 \times 10^7$ | $1.56 \times 10^8$ | $2.91 \times 10^6$ |
| 42 | $2.05 \times 10^8$ | $1.03 \times 10^8$ | $1.29 \times 10^7$ |

* *P. freudenreichii* spore counts per gram (averages over the three cheeses of each type).

*Lactococcus lactis* Counts:

The results are depicted in Table 8. The counts of *Lactococcus lactis* starter cultures gradually declined in all cheeses throughout the 6 weeks of ripening. After day 14, the lacticin-producing starter cultures in cheeses B showed better survival than the non-bacteriocin-producing starter cultures or the nisin-producing starter cultures in cheeses A and C respectively. The survival rates for day 35 and day 42 could not be properly determined, as concentrations decreased below $1 \times 10^6$ cfu/ml.

TABLE 8

*L. lactis* spore counts

| | Cheeses * | | |
|---|---|---|---|
| Day | A | B | C |
| 1 | $1.68 \times 10^9$ | $5.39 \times 10^8$ | $7.72 \times 10^8$ |
| 7 | $3.81 \times 10^8$ | $3.32 \times 10^8$ | $1.75 \times 10^9$ |
| 14 | $4.08 \times 10^8$ | $3.76 \times 10^7$ | $5.03 \times 10^8$ |
| 21 | $1.70 \times 10^7$ | $7.46 \times 10^7$ | $3.56 \times 10^6$ |
| 28 | $9.21 \times 10^6$ | $6.65 \times 10^7$ | $3.77 \times 10^6$ |

* *L. lactis* spore counts per gram (averages over the three cheeses of each type).

Organic acid contents: The results are depicted in Table 9. The nisin present in cheese C is clearly effective in inhibiting butyric acid formation by *Cl. tyrobutyricum*, but at the same time inhibits the formation of acetic acid and propionic acid (all values are lower for cheeses C compared to cheese A). The lacticin in cheeses B is also effective in inhibiting butyric acid formation, but on the other hand does not reduce acetic acid and propionic acid formation but even seems to stimulate the formation thereof. Thus implies that the lactic acid bacteria and Propionibacteria in the starter cultures are not (significantly) inhibited by lacticin, while they are inhibited by nisin.

TABLE 9 organic acid content of the cheeses

| Cheese | Acetic acid (mg/kg) | Propionic acid (mg/kg) | Butyric acid (mg/kg) |
|---|---|---|---|
| A1 | 1330 | 3341 | 3095 |
| A2 | 1298 | 3269 | 3290 |
| A3 | 1670 | 3478 | 2498 |
| average (A) | 1433 | 3363 | 2961 |
| B1 | 2267 | 5787 | 145 |
| B2 | 2780 | 4876 | 334 |
| B3 | 2808 | 5285 | 351 |
| average (B) | 2619 | 5316 | 277 |
| C1 | 2011 | 30 | 330 |
| C2 | 923 | 22 | 149 |
| C3 | 1007 | 146 | 1323 |
| average (C) | 1314 | 66 | 601 |

In conclusion, although nisin-producing starter cultures are effective in preventing *Cl. tyrobutyricum* proliferation, they also inhibit *Propionibacterium freudenreichii* growth, thus resulting in improper Swiss-type cheeses. The cheese obtained from lacticin-producing starter cultures were also sufficiently effective in preventing *Cl. tyrobutyricum* proliferation, but at the same time did not inhibit *Propionibacterium freudenreichii* growth. The Swiss-type cheeses obtained with the lacticin-producing starter cultures were improved in terms of *Propionibacterium* content, eye formation and structure.

The invention claimed is:

1. A method for the production of curd comprising inoculating a precursor with a starter culture comprising unmodified dairy Propionibacteria, a strain of lactic acid bacteria and a source of lacticin 3147, wherein the starter culture comprises no source of nisin and class IIa bacteriocin, wherein the amount of the source of lacticin 3147 is such that the curd and/or cheese produced with the starter culture comprises at least 0.1 mg lacticin 3147 per kg curd and/or cheese, and wherein the amount of dairy Propionibacteria comprised in the starter culture is such that at least $10^2$ cfu dairy Propionibacteria are added to 1 gram of precursor for curd and/or cheese.

2. The method according to claim 1, wherein the unmodified dairy Propionibacteria comprise a strain of *P. johnsonii*, a strain of *P. freudenreichii* subsp. *freudenreichii*, a strain of *P. freudenreichii* subsp. *Shermanii*, and a mixture thereof.

3. The method according to claim 1, wherein the strain of lactic acid bacteria comprises the source of lacticin 3147.

4. The method according to claim 1, wherein the source of lacticin 3147 further comprises a strain of *Lactococcus lactis*.

5. The method according to claim 1, wherein the source of lacticin 3147 is a strain of *Lactococcus lactis* subsp.

6. The method according to claim 5, wherein the strain of *Lactococcus lactis* subsp. is a strain of *L. lactis* subsp. *lactis*, a strain of *L. lactis* subsp. *cremoris* or a strain of *L. lactis* subsp. *lactis* biovar. *diacetylactis*.

7. The method according to claim 1, wherein the source of lacticin 3147 is a lactococcal strain containing plasmid pMRC01.

8. The method according to claim 1, wherein the strain of lactic acid bacteria further comprises a strain of *Streptococcus thermophilus*.

9. The method according to claim 1, wherein the starter culture further comprises a strain of *Lactobacillus delbrueckii* subsp., a strain of *Lactobacillus helveticus* and/or a strain of *Lactobacillus acidophilus*.

10. The method according to claim 9, wherein the strain of *Lactobacillus delbrueckii* subsp is a strain of *L. delbrueckii* subsp. *lactis*.

11. The method according to claim 1, wherein the precursor comprises milk.

12. A starter culture for making curd and/or cheese comprising unmodified dairy Propionibacteria, a strain of lactic acid bacteria and a source of lacticin 3147, wherein the starter culture comprises no source of nisin and class IIa bacteriocin, wherein the amount of the source of lacticin 3147 is such that the curd and/or cheese produced with the starter culture comprises at least 0.1 mg lacticin 3147 per kg curd and/or cheese, and wherein the amount of dairy Propionibacteria comprised in the starter culture is such that at least $10^2$ cfu dairy Propionibacteria are added to 1 gram of precursor for curd and/or cheese.

13. The starter culture according to claim 12, wherein the strain of lactic acid bacteria comprises the source of lacticin, and wherein the source of lacticin comprises a strain of *Lactococcus lactis*, and/or wherein the source of lacticin is a bacterial strain capable of producing lacticin selected from the group consisting of a strain of *Lactococcus lactis* subsp., a strain of *L. lactis* subsp. *lactis*, a strain of *L. lactis* subsp. *cremoris*, and a strain of *L. lactis* subsp. *lactis* biovar. *diacetylactis*.

14. The starter culture according to claim 13, further comprising one or more strains selected from *Lactobacillus delbrueckii* subsp. *lactis*, and/or *Lactobacillus acidophilus* and/or *Lactobacillus helveticus* and/or *Streptococcus thermophilus*.

15. A method for the production of cheese, comprising using curd obtained by the method of claim 1.

16. A curd obtainable by the method according to claim 1.

17. The starter culture according to claim 12, wherein the amount of the source of lacticin 3147 is such that the curd and/or cheese produced with the starter culture comprises lacticin sufficient to prevent proliferation of spores of *Clostridium tyrobutyricum*.

* * * * *

SEQUENCE LISTING

<160> NUMBER OF SEQ ID NOS: 11

<210> SEQ ID NO 1
<211> LENGTH: 18
<212> TYPE: DNA
<213> ORGANISM: Artificial sequence

```
<220> FEATURE:
<223> OTHER INFORMATION: synthetic primer 27-F

<400> SEQUENCE: 1
ggggaacaat cttaccta                                                    18

<210> SEQ ID NO 2
<211> LENGTH: 23
<212> TYPE: DNA
<213> ORGANISM: Artificial sequence
<220> FEATURE:
<223> OTHER INFORMATION: synthetic primer 27-R

<400> SEQUENCE: 2
attattttta ttgcattcta cta                                              23

<210> SEQ ID NO 3
<211> LENGTH: 22
<212> TYPE: DNA
<213> ORGANISM: Artificial sequence
<220> FEATURE:
<223> OTHER INFORMATION: synthetic primer 49-F

<400> SEQUENCE: 3
ccaatacccg ccaaaataaa gt                                               22

<210> SEQ ID NO 4
<211> LENGTH: 23
<212> TYPE: DNA
<213> ORGANISM: Artificial sequence
<220> FEATURE:
<223> OTHER INFORMATION: synthetic primer 49-R

<400> SEQUENCE: 4
ctaagcgcag aggaaataca acc                                              23

<210> SEQ ID NO 5
<211> LENGTH: 24
<212> TYPE: DNA
<213> ORGANISM: Artificial sequence
<220> FEATURE:
<223> OTHER INFORMATION: synthetic primer 51-F

<400> SEQUENCE: 5
ttctcaaaat catcaaaatc aagt                                             24

<210> SEQ ID NO 6
<211> LENGTH: 20
<212> TYPE: DNA
<213> ORGANISM: Artificial sequence
<220> FEATURE:
<223> OTHER INFORMATION: synthetic primer 51-R

<400> SEQUENCE: 6
gtacgaacag gagcgaaaaa                                                  20

<210> SEQ ID NO 7
<211> LENGTH: 23
<212> TYPE: DNA
<213> ORGANISM: Artificial sequence
<220> FEATURE:
<223> OTHER INFORMATION: synthetic primer 52-F

<400> SEQUENCE: 7
cctaagttgt ctattcgtgt cca                                              23
```

```
<210> SEQ ID NO 8
<211> LENGTH: 24
<212> TYPE: DNA
<213> ORGANISM: Artificial sequence
<220> FEATURE:
<223> OTHER INFORMATION: synthetic primer 52-R

<400> SEQUENCE: 8
attaggtgag tgctctgatt tttc                                              24

<210> SEQ ID NO 9
<211> LENGTH: 23
<212> TYPE: DNA
<213> ORGANISM: Artificial sequence
<220> FEATURE:
<223> OTHER INFORMATION: synthetic primer nisA-F

<400> SEQUENCE: 9
caaaagattt taacttggat ttg                                               23

<210> SEQ ID NO 10
<211> LENGTH: 22
<212> TYPE: DNA
<213> ORGANISM: Artificial sequence
<220> FEATURE:
<223> OTHER INFORMATION: synthetic primer nisA-R

<400> SEQUENCE: 10
acgtgaatac tacaatgaca ag                                                22

<210> SEQ ID NO 11
<211> LENGTH: 22
<212> TYPE: DNA
<213> ORGANISM: Artificial sequence
<220> FEATURE:
<223> OTHER INFORMATION: synthetic primer nisFG-F

<400> SEQUENCE: 11
ggtttaattt ctgcagatac tg                                                22
```